(12) United States Patent
Chun et al.

(10) Patent No.: US 8,218,524 B2
(45) Date of Patent: Jul. 10, 2012

(54) METHOD FOR TRANSMITTING OR RECEIVING DATA UNIT USING HEADER FIELD EXISTENCE INDICATOR

(75) Inventors: Sung-Duck Chun, Gyeonggi-Do (KR); Young-Dae Lee, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 12/596,662

(22) PCT Filed: Apr. 30, 2008

(86) PCT No.: PCT/KR2008/002462
§ 371 (c)(1),
(2), (4) Date: Oct. 19, 2009

(87) PCT Pub. No.: WO2008/133480
PCT Pub. Date: Nov. 6, 2008

(65) Prior Publication Data
US 2010/0208650 A1   Aug. 19, 2010

Related U.S. Application Data

(60) Provisional application No. 60/915,042, filed on Apr. 30, 2007.

(30) Foreign Application Priority Data

Apr. 30, 2008   (KR) .......................... 10-2008-0040309

(51) Int. Cl.
*H04J 3/24* (2006.01)

(52) U.S. Cl. ......................................... 370/349; 370/477
(58) Field of Classification Search .................. None
See application file for complete search history.

(56) References Cited

U.S. PATENT DOCUMENTS

| | | |
|---|---|---|
| 4,205,200 A | 5/1980 | Parikh et al. |
| 6,567,409 B1 | 5/2003 | Tozaki et al. |
| 6,725,267 B1 | 4/2004 | Hoang |
| 6,795,419 B2 | 9/2004 | Parantainen et al. |
| 7,245,707 B1 | 7/2007 | Chan |

(Continued)

FOREIGN PATENT DOCUMENTS

CN   1719932   1/2006

(Continued)

OTHER PUBLICATIONS

Sammour, M.; "Method and System for Enhancing Discontinuous Reception in Wireless Systems"; U.S. Appl. No. 60/863,185; Oct. 27, 2006.

(Continued)

*Primary Examiner* — Anh-Vu Ly
(74) *Attorney, Agent, or Firm* — Lee, Hong, Degerman, Kang & Waimey (57) ABSTRACT

A method for transmitting and receiving data between a base station and a terminal in an E-UMTS (Evolved Universal Mobile Telecommunications System) or an LTE (Long Term Evolution) system is disclosed. A header overhead of data transmitted from a wireless end can be minimized by adding a header field existence indicator indicating presence or absence of a header in an upper data block to a data block of a lower layer, to thus effectively use radio resources.

12 Claims, 4 Drawing Sheets

(a) When there are other header fields (b) When there is no other header field

U.S. PATENT DOCUMENTS

| | | |
|---|---|---|
| 7,443,813 B2 | 10/2008 | Hwang et al. |
| 7,525,908 B2 | 4/2009 | Olsson et al. |
| 7,551,643 B2 | 6/2009 | Yeo et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 | 8/2001 | Kalliokulju |
| 2001/0034791 A1 | 10/2001 | Clubb et al. |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2003/0007490 A1 | 1/2003 | Yi et al. |
| 2003/0050078 A1 | 3/2003 | Motegi et al. |
| 2003/0123485 A1 | 7/2003 | Yi et al. |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2004/0014452 A1 | 1/2004 | Lim et al. |
| 2004/0042507 A1 | 3/2004 | Pelletier et al. |
| 2004/0100940 A1 | 5/2004 | Kuure et al. |
| 2004/0117860 A1 | 6/2004 | Yi et al. |
| 2004/0148427 A1 | 7/2004 | Nakhjiri et al. |
| 2004/0180675 A1 | 9/2004 | Choi et al. |
| 2004/0185837 A1 | 9/2004 | Kim et al. |
| 2004/0229605 A1 | 11/2004 | Hwang et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0041610 A1 | 2/2005 | Lee et al. |
| 2005/0041681 A1 | 2/2005 | Lee et al. |
| 2005/0063347 A1 | 3/2005 | Sarkkinen et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2005/0286470 A1 | 12/2005 | Asthana et al. |
| 2006/0013165 A1 | 1/2006 | Choi et al. |
| 2006/0034335 A1 | 2/2006 | Karaoguz et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0165045 A1 | 7/2006 | Kim et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0041382 A1* | 2/2007 | Vayanos et al. ............... 370/394 |
| 2007/0047452 A1 | 3/2007 | Lohr et al. |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0155389 A1 | 7/2007 | Zhang |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0248075 A1 | 10/2007 | Liu et al. |
| 2007/0258591 A1 | 11/2007 | Terry et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1* | 12/2007 | Sammour et al. ............. 370/466 |
| 2007/0293224 A1 | 12/2007 | Wang et al. |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1* | 8/2008 | Marinier et al. ............... 370/349 |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0267126 A1 | 10/2008 | Vujcic et al. |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0285691 A1 | 11/2008 | Onggosanusi et al. |
| 2008/0310452 A1* | 12/2008 | Vedantham et al. .......... 370/474 |
| 2008/0316959 A1 | 12/2008 | Bachl et al. |
| 2009/0022107 A1 | 1/2009 | Kapoor et al. |
| 2009/0040982 A1 | 2/2009 | Ho et al. |
| 2009/0086659 A1* | 4/2009 | Pani et al. ...................... 370/310 |
| 2009/0086710 A1* | 4/2009 | Ho ................................. 370/349 |
| 2009/0092076 A1* | 4/2009 | Zheng et al. ................... 370/328 |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0181710 A1 | 7/2009 | Pani et al. |
| 2009/0207771 A1 | 8/2009 | Lindskog et al. |
| 2009/0239538 A1 | 9/2009 | Motegi et al. |
| 2009/0318170 A1 | 12/2009 | Lee et al. |
| 2010/0027413 A1 | 2/2010 | Park et al. |
| 2010/0046384 A1 | 2/2010 | Lee et al. |
| 2010/0061330 A1* | 3/2010 | Hanov ........................... 370/329 |
| 2010/0067495 A1 | 3/2010 | Lee et al. |
| 2010/0128669 A1* | 5/2010 | Chun et al. ..................... 370/328 |
| 2010/0165901 A1 | 7/2010 | Kim |
| 2010/0227614 A1 | 9/2010 | Chun et al. |
| 2010/0238799 A1 | 9/2010 | Sebire |
| 2010/0238903 A1 | 9/2010 | Kitazoe |
| 2010/0254340 A1 | 10/2010 | Park et al. |
| 2010/0265896 A1 | 10/2010 | Park et al. |
| 2010/0272004 A1 | 10/2010 | Maeda et al. |
| 2010/0309877 A1 | 12/2010 | Damnjanovic et al. |
| 2011/0039536 A1 | 2/2011 | Lee et al. |
| 2011/0090836 A1 | 4/2011 | Mochizuki et al. |
| 2011/0116436 A1 | 5/2011 | Bachu et al. |
| 2012/0002589 A1 | 1/2012 | Saifullah et al. |

FOREIGN PATENT DOCUMENTS

| | | |
|---|---|---|
| EP | 1168877 | 1/2002 |
| EP | 1209938 | 5/2002 |
| EP | 1315356 | 5/2003 |
| EP | 1318632 | 6/2003 |
| EP | 1337124 | 8/2003 |
| EP | 1372310 | 12/2003 |
| EP | 1511245 | 3/2005 |

| | | |
|---|---|---|
| EP | 1517565 | 3/2005 |
| EP | 1720322 | 11/2006 |
| EP | 1720373 | 11/2006 |
| JP | 06-006294 | 1/1994 |
| JP | 2003-087180 | 3/2003 |
| JP | 2003-196775 | 7/2003 |
| JP | 2003-235064 | 8/2003 |
| JP | 2005057787 | 3/2005 |
| JP | 2005354488 | 12/2005 |
| JP | 2006067115 | 3/2006 |
| JP | 2006528456 | 12/2006 |
| JP | 2007165635 | 6/2007 |
| JP | 2009540721 | 11/2009 |
| JP | 2009542100 | 11/2009 |
| KR | 10-2001-0105240 | 11/2001 |
| KR | 2002-0001173 A | 1/2002 |
| KR | 2002-0014939 A | 2/2002 |
| KR | 20040039944 | 5/2004 |
| KR | 20040048675 | 6/2004 |
| KR | 20050008440 | 1/2005 |
| KR | 2005-0019560 A | 3/2005 |
| KR | 20050096763 | 10/2005 |
| RU | 2249917 | 4/2005 |
| WO | 0054521 | 9/2000 |
| WO | 0074416 | 12/2000 |
| WO | 0105050 | 1/2001 |
| WO | 2004043099 | 5/2004 |
| WO | 2004064272 | 7/2004 |
| WO | 2006/049441 | 5/2006 |
| WO | 2006/075820 | 7/2006 |
| WO | 2006104344 | 10/2006 |
| WO | 2006109851 | 10/2006 |
| WO | 2006/116620 | 11/2006 |
| WO | 2007/025138 | 3/2007 |
| WO | 2007052888 | 5/2007 |
| WO | 2007/078929 | 7/2007 |
| WO | 2007078155 | 7/2007 |
| WO | 2007078172 | 7/2007 |
| WO | 2008/042889 | 4/2008 |
| WO | 2008/054103 | 5/2008 |
| WO | 2008/111684 | 9/2008 |
| WO | 2009/084998 | 7/2009 |

OTHER PUBLICATIONS

ASUSTeK, "Granularity Consideration for Variable RLC PDU Sizes," R2-070336, 3GPP TSG-RAN WG2 Meeting #56 bis, Jan. 2007, XP-050133423.
3rd Generation Partnership Project (3GPP), "Technical Specification Group Radio Access Network; Medium Access Control (MAC) Protocol Specification (Release 7)," 3GPP TS 25.321, v7.4.0, Mar. 2007, XP-050367709.
Y. Gao et al., "Research on the Access Network and MAC Technique for Beyond 3G Systems," IEEE Wireless Communications, Apr. 2007, XP-011184637.
Nokia, "Active mode DRX details," R2-062753, 3GPP TSG-RAN WGx Meeting #55, Oct. 2006, XP-002437990.
NTT DoCoMo, Inc., "Views on DRX/DTX control in LTE," R2-063397, 3GPP TSG RAN WG2 #56, Nov. 2006.
Email Rapporteur (Nokia), "DRX in E-UTRAN," R2-070463, 3GPP TSG-RAN WG2 Meeting #57, Feb. 2007.
Ericsson, "MAC header for Improved L2 support for high data rates", R2-070810, 3GPP TSG-RAN WG2#57, Feb. 2007, XP50133836.
Nokia Corp., "MAC Header Format," 3GPP TSG-RAN WG2 Meeting #59 bis, R2-073891, Oct. 2007, XP-002602993.
LG Electronics Inc., "Support for VoIP over MAC-hs/ehs," 3GPP TSG-RAN WG2 Meeting #57 bis, R2-071542, Mar. 2007, XP-050134474.
Alcatel-Lucent, "DL Control Signaling and Multiplexing for VoIP," 3GPP TSG-RAN WG1 Meeting #48 bis, R1-071721, Mar. 2007, XP-002460800.
3rd Generation Partnership Project (3GPP); "Technical Specification Group Radio Access Network; Evolved Universal Terrestrial Radio Access (E-UTRA) Medium Access Control (MAC) Protocol Specification (Release 8)," 3GPP TS 36.321, v8.1.0, Mar. 2008, XP-050377617.
LG Electronics Inc., "UL Timing Control Related to Contention Resolution," R2-081607, 3GPP TSG-RAN WG2 #61 bis, Mar. 2008, XP-050139334.
LG Electronics Inc., "Relative Buffer Status Reporting," 3GPP TSG-RAN WG2 Meeting #46bis, R2-050852, Apr. 2005.
IP Wireless, "Layer 2 Functions for LTE," 3GPP TSG RAN WG2 #48bis, R2-052377, Oct. 2005.
Samsung, "Re-use of PDCP SN at ARQ Level?," 3GPP TSG-RAN2 Meeting #53bis, R2-061829, Jun. 2006.
Panasonic, "MAC PDU Format for LTE," 3GPP TSG RAN WG2 #56bis, R2-070096, Jan. 2007.
Samsung, "Selective Forwarding/Retransmission During HO," 3GPP TSG-RAN2 Meeting #56bis, R2-070130, Jan. 2007.
Nokia, "Requirements for Redirection in E-UTRAN," 3GPP TSG-RAN WG2 Meeting #56-bis, R2-070107, Jan. 2007.
NTT Docomo, Inc., "MAC PDU Structure for LTE", 3GPP TSG RAN WG2 #56bis, R2-070280, XP-050133369, Jan. 15, 2007.
Catt, et al., "Enhancement to Buffer Status Reporting", 3GPP TSG RAN WG2 #57bis, R2-071345, XP-050134291, Mar. 26, 2007.
LG Electronics, Inc., "PDCP Retransmissions," 3GPP TSG-RAN WG2 #59, R2-073041, XP-050135778, Aug. 19, 2007.
LG Electronics, Inc., "PDCP Structure and Traffic Path," 3GPP TSG-RAN WG2 #59, R2-073259, XP-050135985, Aug. 20, 2007.
LG Electronics, Inc., "Contents of PDCP Status Report," 3GPP TSG-RAN WG2 #59, R2-07xxxx, XP-002580785, Oct. 8, 2007.
Bosch, "Header Compression Signalling," TSGR2#9(99)i32, TSG-RAN Working Group 2 (Radio Layer 2 and Radio Layer 3), Nov. 1999, XP-050114120.
3rd Generation Partnership Project (3GPP), "Technical Specification Group Radio Access Network; Packet Data Convergence Protocol (PDCP) Specification (Release 7)," 3GPP TS 25.323, v7.4.0, Mar. 2007, XP-050367856.
NTT Docomo, Inc., "E-mail Discussion on U-plane ciphering location for LTE", R2-071293, 3GPP TSG RAN WG2#57bis, Mar. 2007.
LG Electronics, "U-plane ciphering at MAC/Physical Layer", R2-071550, 3GPP TSG RAN WG2#57bis, Mar. 2007.
Ericsson, "Initial Random Access Procedure for E-UTRAN", Tdoc R2-062853, 3GPP TSG-RAN WG2 #55, Oct. 2006.
Samsung, "LTE Random access procedure", R2-062258, 3GPP TSG RAN2#54, Sep. 2006.
Siemens, "Initial Access Procedure", R2-061931, 3GPP TSG-RAN WG2 LTE AdHoc Meeting, Jun. 2006.
IPWIRELESS, "Contention Resolution in Non-synchronous RACH Access", Tdoc R2-062269, RAN2#54, Sep. 2006.
IPWireless, "Contention Resolution in Non-synchronous RACH Access", R2-062269, RAN2 #54, Aug. 2006.
LG Electronics, "Discussion on Message 4 in Random Access", R2-070519, 3GPP TSG-RAN WG2 #57, Feb. 2007.
LG Electronics, "Discussion on Message 4 in Random Access", R2-071456, 3GPP TSG-RAN WG2 #57bis, Mar. 2007.
LG Electronics, "Discussion on Message 4 in Random Access", R2-071923, 3GPP TSG-RAN WG2 #58, May 2007.
LG Electronics, "DRX Scheme", R2-070265, 3GPP TS-Ran WG2 #56bis, Jan. 2007.
Nokia, "Discontinuous reception in Cell_Fach", R2-071403, 3GPP TSG-Ran WG2 Meeting #58, Mar. 2007.
Catt, "Non-synchronized access and C-RNTI allocation", R2-062933, 3GPP TS-Ran WG2#55, Oct. 2006.

* cited by examiner

(a) When there are other header fields in RLC PDU (b) When there is no other header field

METHOD FOR TRANSMITTING OR RECEIVING DATA UNIT USING HEADER FIELD EXISTENCE INDICATOR

CROSS-REFERENCE TO RELATED APPLICATIONS

This application is the National Stage filing under 35 U.S.C. 371 of International Application No. PCT/KR2008/002462, filed on Apr. 30, 2008, which claims the right of priority to Korean Application No. 10-2008-0040309, filed on Apr. 30, 2008, and also claims the benefit of U.S. Provisional Application Ser. No. 60/915,042, filed on Apr. 30, 2007.

TECHNICAL FIELD

The present invention relates to a method for transmitting and receiving data between a base station and a terminal in an E-UMTS (Evolved Universal Mobile Telecommunications System) or an LTE (Long Term Evolution) system, and more particularly, to a method for minimizing a header overhead of data transmitted from a wireless end, by adding a header field existence indicator indicating presence or absence of a header in an upper data block to a data block of a lower layer, to thus effectively use radio resources.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Figure 1:
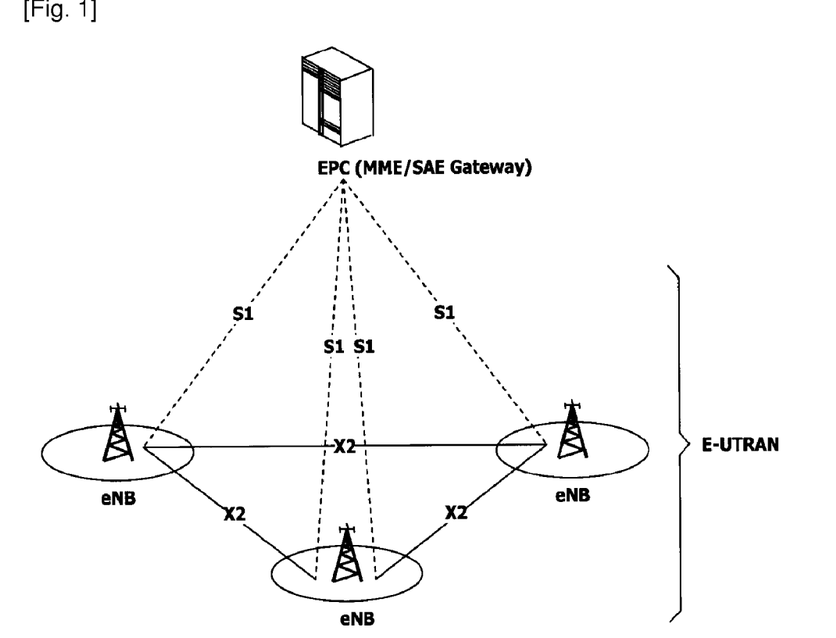
FIG. 1 shows a network structure of the E-UMTS, a mobile communication system applicable to the related art and the present invention.

FIG. 1 is a network structure of the E-UMTS, a mobile communication system applicable to the related art and the present invention.

With reference to FIG. 1, the E-UMTS network includes an E-UTRAN and an EPC (Evolved Packet Core). An interface between the E-UTRAN and the EPC can be used. An S1 interface can be used between the eNodeBs and the EPC. The eNodeBs are connected with each other through an X2 interface, and the X2 interface may be present between adjacent eNodeBs in a meshed network structure.

Figure 2:
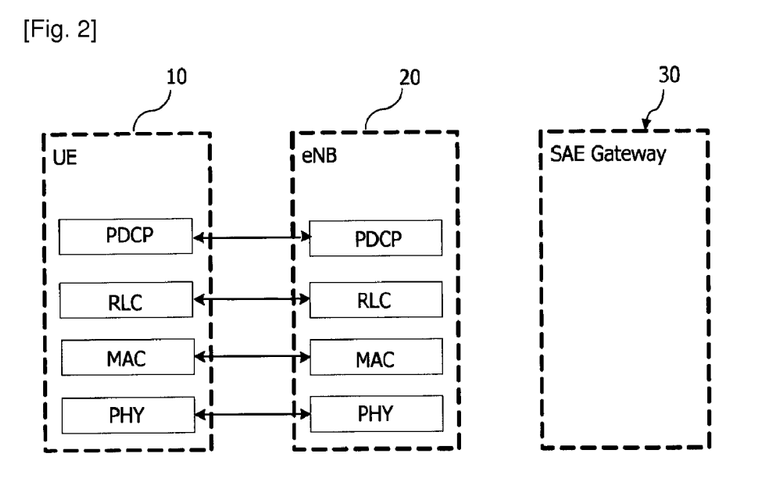
FIG. 2 shows an exemplary structure of a control plane of a radio interface protocol between a UE and a UTRAN based on the 3GPP radio access network standards.
Figure 3:
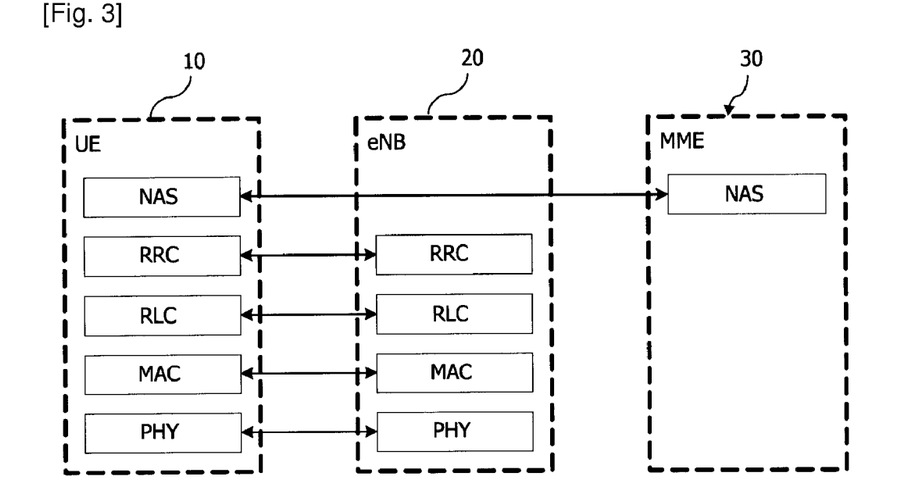
FIG. 3 shows an exemplary structure of a user plane of the radio interface protocol between the UE and the UTRAN based on the 3GPP radio access network standards.

FIGS. 2 and 3 are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2 and 3 is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the establishment, reconfiguration, and release of the radio bearers (RBs). Here, the RB signifies a service provided by the second layer (L2) for data transmission between the terminal and the UTRAN. Voice information generated through an AMR (Adaptive Multi-Rate) codec (3GPP audio codec), namely, a voice codec used for a general voice call has special characteristics. The voice data include two types of patterns. A first pattern includes an interval during which a user actually talks, namely, a talk spurt, and a second pattern includes an interval during which the user does not speak, namely, a silent period. In general, voice packets including the voice information are generated at every 20 ms during the talk spurt, and the silent packets (SIDs) including the voice information is generated at every 160 ms during the silent period.

In addition, the ARM codec used for the voice call includes various modes and each mode is discriminated by the amount of data of the voice information. If the voice AMR codec operates in a mode, the AMR codec entity generates voice information of a certain size at certain time intervals. Thus, unless the mode of the AMR codec is changed, the size of the voice information packets delivered from an upper end (upper layer, upper stage) to a radio protocol entity is uniform (regular).

Figure 4:
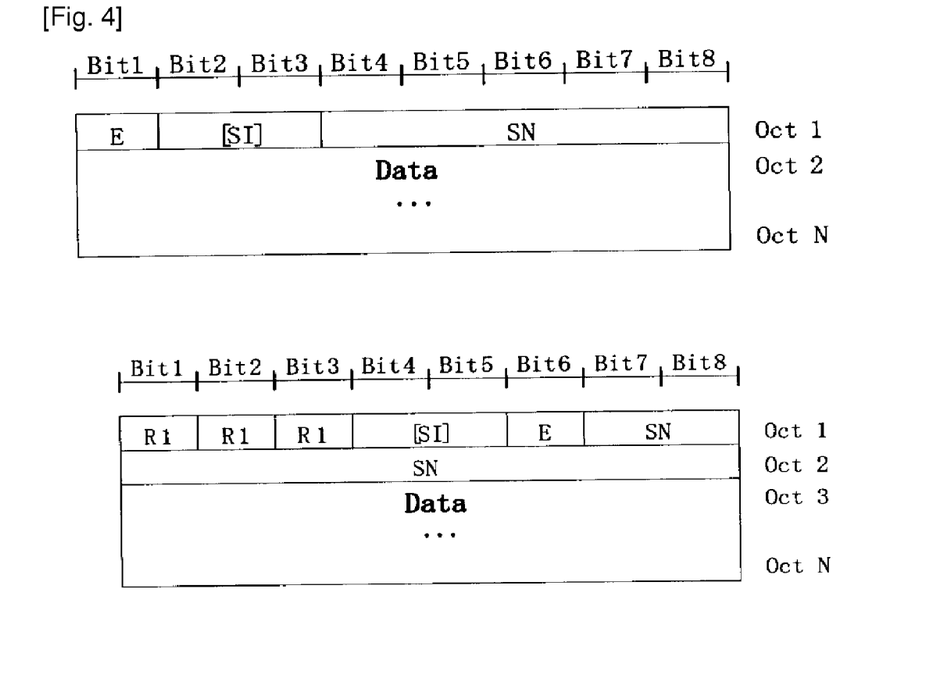
FIG. 4 shows a format structure of a PDU (Protocol Data Unit) used for a UM RLC (Unacknowledged Mode Radio Link Control) entity.

FIG. 4 shows the format of an RLC PDU used for an RLC entity. As shown in FIG. 4, an E-field informs whether information such as an LI (Length Indicator) is additionally added or not later. An SN field informs a sequence number of a corresponding PDU (Protocol Data Unit). An SI field informs whether a first byte of an included first SDU (Service Data Unit) is the same as a first byte of a data field of the PDU, or whether a final byte of the included final SDU is the same as a final byte of the data field of the PDU.

Here, the RLC functions to segments and re-combines RLC SDUs received from an upper layer to generate RLC PDUs, and re-assembles RLC PDUs received from a lower layer to restore RIC SDUs. Thus, a header of each RLC PDU includes re-combination information for segmentation or assembling, namely, segmentation information. Namely, all the SI, SN, E, and LI as described above can be the segmentation information.

Figure 5:
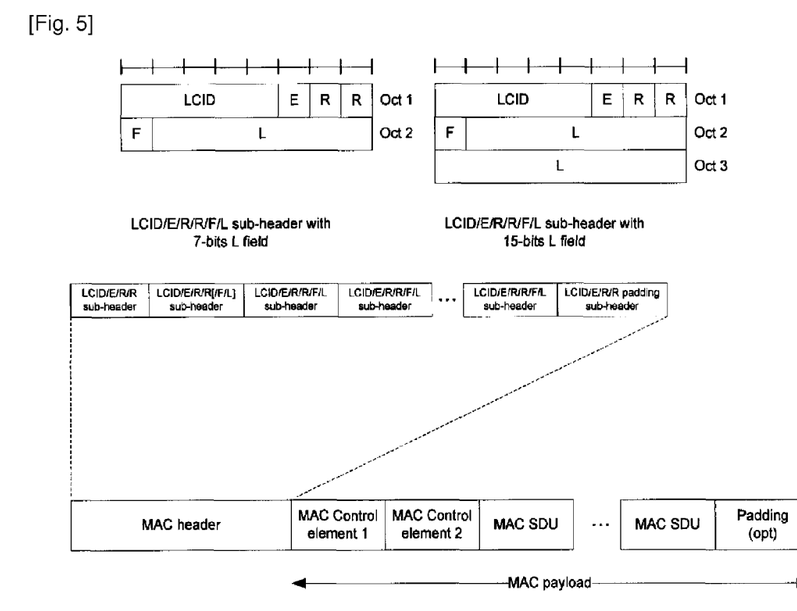
FIG. 5 shows a format structure of a PDU used for a MAC (Medium Access Control) entity.

FIG. 5 shows the format of a PDU used in the MAC entity. In FIG. 5, an LCID informs to which logical channel, an MAC SDU corresponds, and the field 'L' informs about the size of a corresponding MAC SDU. The field 'E' informs whether additional headers exist.

As described above, the packet information generated for the voice call communication has a certain characteristic. Namely, a voice packet generated from the voice call is created with a fixed size during a fixed time interval. In particular, since the voice packet is generated at every 20 ms and voice information is sensitive to a transmission delay, the terminal or the base station must process the voice packet immediately when it arrives, such that the voice packet can be processed before a next voice packet arrives. Usually, in this case, since only one voice packet exists in the receiving side at every interval, the receiving side does not need to perform any re-ordering process for a preceding packet or a subsequent packet nor to perform any special operation. Notwithstanding, in the conventional RLC PDU format, a sequence number is added to every RLC PDU. In addition, in most cases, only one voice packet is generated at every interval, and a single RLC PDU includes such voice packet. Thus, the information of LI (Length indicator) should not be included at the most time intervals. However, in the conventional RLC PDU format, the information of LI has to be included in the RLC PDU, thereby increasing the overhead of the RLC PDU.

DISCLOSURE OF INVENTION

Technical Solution

The present invention has been developed in order to solve the above described problems of the related art. As a result, the present invention provides a method of transmitting or receiving data unit using a header field existence indicator, thereby utilizing radio resources in improved and efficient manner.

To implement at least the above feature in whole or in parts, the present invention may provide a method of processing data units in a mobile communications system, the method comprising: generating a first data unit by a first layer; transferring the generated first data unit to a second layer; and generating a second data unit using the first data unit by the second layer, wherein the second data unit includes at least one indicator to indicate whether or not at least one field is existed in a header of the first data unit. The present invention may provide a method of processing data units in a mobile communications system, the method comprising: receiving a first data unit from a lower layer; checking whether or not at least one header field existence indicator is included in the first data unit; generating a second data unit according to the checking step, and a mobile terminal for processing data units in a mobile communications system, the mobile terminal comprising: a first radio protocol entity adapted to generate a first data unit and to transfer the generated first data unit to a second radio protocol entity; and the second radio protocol entity adapted to generate a second data unit using the first data unit, wherein the second data unit includes at least one indicator to indicate whether or not at least one field is existed in a header of the first data unit.

Additional features of this disclosure will be set forth in part in the description which follows and in part will become apparent to those having ordinary skill in the art upon examination of the following or may be learned from practice of this disclosure. The objectives and other advantages of this disclosure may be realized and attained by the structure particularly pointed out in the written description and claims hereof as well as the appended drawings.

MODE FOR THE INVENTION

Reference will now be made in detail to the preferred embodiments of this disclosure, examples of which are illustrated in the accompanying drawings.

One aspect of the present invention is the recognition by the present inventors regarding the problems and drawbacks of the related art described above and explained in more detail hereafter. Based upon such recognition, the features of the present invention have been developed.

Although this disclosure is shown to be implemented in a mobile communication system, such as a UMTS developed under 3GPP specifications, this disclosure may also be applied to other communication systems operating in conformity with different standards and specifications.

Figure 6:
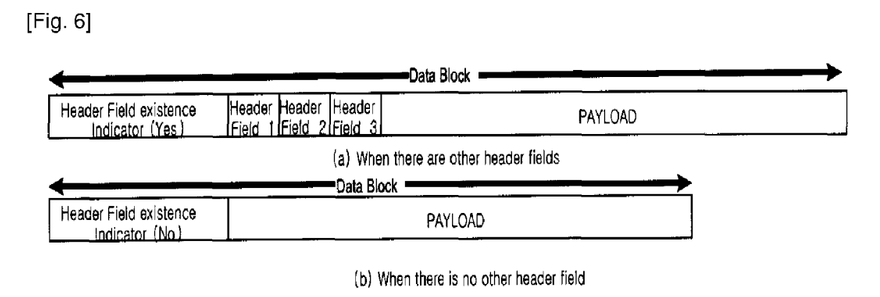
FIG. 6 shows a data block transmission/reception method according to a first exemplary embodiment of the present invention.

FIG. 6 shows a data block (or data unit) transmission/reception method according to a first exemplary embodiment of the present invention. As illustrated in FIG. 6, a case (a) shows a header field existence indicator is set as 'Yes' as a header exists in a data block, and case (b) shows the header field existence indicator is set as 'No' as a header does not exist in a data block. According to the present invention, a header field existence indicator in a data block is used so as to inform whether or not a certain data block has a header.

Specifically, during constructing or generating a data block, a transmitting side may include the header field existence indicator at a front portion of the data block, and in this case, if a header field exists (besides the header field existence indicator), the header field existence indicator is set as 'Yes' (which means the presence of a header), and if there is no other header field (besides the header field existence indicator), the header field existence indicator is set as 'No' (which means the absence of a header), and then, the corresponding data block including the header field existence indicator may be transmitted from the transmitting side.

Also, upon receiving of the corresponding data block, a receiving side may check the header field existence indicator, which may be located at the front portion of the received data block, and if the header field existence indicator indicates the presence of a header, the receiving side may decode the data block with assumption that a previously designated type of header is existed together with the header field existence indicator, and if the header field existence indicator indicates the absence of a header, the receiving block may decode the data block with assumption that the header field existence indicator is only existed in the data block. Here, the header field existence indicator may exist at the front portion of the data block, or the header field existence indicator may be considered as another header field in the data block. Here, the data block may be a MAC PDU (Medium Access Control Protocol Data Unit), a RLC PDU (Radio Link Control Protocol Data Unit), or a PDCP (Packet Data Convergence Protocol) PDU.

In order to effectively utilize radio resources, during a course of constructing or generating a lower data block unit upon receiving data block units from an upper layer, the lower data block unit may include an indicator to indicate an existence of a header in the upper data block units. In the transmitting side, when an upper entity transmits upper data block units to a lower entity, the upper entity may inform the lower entity whether the upper data block units have a header or not. Also, the lower entity of the transmitting side may generate lower data block units by using the upper data block units which have been received from the upper entity. The lower entity may also include the header field existence indicator to indicate whether or not each upper data block unit included in the lower data block unit has a header, and then may transmit the lower data block units having the header field existence indicator.

During the process as described above, if each upper data block included in the lower data block units does not have a header, the header field existence indicator may be set to indicate the absence of a header. If each upper data block unit included in the lower data block units has a header, the header field existence indicator may be set to indicate the presence of a header.

With respect to the lower data block units received from the transmitting side, the receiving side may decode each upper data block unit from the lower data block units, may check the header field existence indicator related to each upper data block unit, and may transmit the header field existence indicator together with the relevant upper data block units to the upper entity. If a header field existence indicator related to a certain upper data block unit indicates that there is a header, the lower entity may inform the upper entity about the presence of the header when it transmits the upper data block unit to the upper entity. if a header field existence indicator related to a certain upper data block unit indicates that there is no header, the lower entity may inform the upper entity about the absence of a header when it transmits the upper data block unit to the upper entity.

With respect to the data block received from the lower entity, if the lower entity informs that the data block has a header, the upper entity of the receiving block may decode the data block supposing that a header of a previously designated format exists together with the header field existence indicator in the data block, and if the lower entity informs that the data block has no header, the upper entity of the receiving side may decode the data block supposing that only the header field existence indicator exists in the data block.

Figure 7:
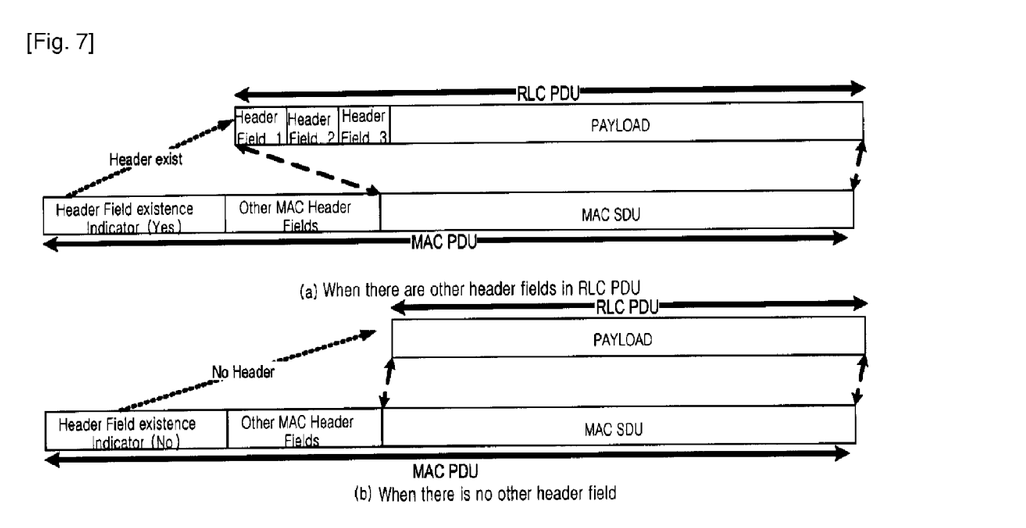
FIG. 7 shows a data block transmission/reception method according to a second exemplary embodiment of the present invention.

FIG. 7 shows a data block transmission/reception method according to a second exemplary embodiment of the present invention. Specifically, FIG. 7 shows a process of adding a PDU to a MAC PDU. In FIG. 7, (a) shows a case where, if an RLC PDU includes a header, the presence of the header in the RLC PDU is informed by using a header field existence indicator, which set to 'Yes', of the MAC SDU, and (b) shows a case where, if an RLC PDU does not have a header, the absence of a header in the RLC PDU is informed by using a header field existence indicator, which set to 'No', of the MAC PDU.

The present invention is directed to minimize overhead due to a header to thus effectively use radio resources, so in the process of generating a lower data block upon receiving data blocks from the upper layer, the present invention may propose to include information about whether or not any particular header field exists in an upper block within the lower data block. Specifically, in order to inform whether or not the upper data block has any particular header field, the present invention may propose to include and use the header field existence indicator in the lower data block. Here, the header field existence indicator may indicate whether or not the upper data blocks has been segmented into smaller units or whether or not the upper data blocks have been concatenated to other upper data blocks.

The present invention may provide a method of processing data units in a mobile communications system, the method comprising: generating a first data unit by a first layer; transferring the generated first data unit to a second layer; and generating a second data unit using the first data unit by the second layer, wherein the second data unit includes at least one indicator to indicate whether or not at least one field is existed in a header of the first data unit, wherein the first data unit is a RLC (radio link control) PDU (protocol data unit), the first layer is a RLC (radio link control) layer, the second data unit is a MAC (medium access control) PDU (protocol data unit), the second layer is a MAC (medium access control) layer, the at least one indicator is a header field existence indicator, the at least one indicator is positioned in a first field of the second data unit, the first data unit is a PDCP (packet data convergence protocol) PDU (protocol data unit) and the second data unit is a RLC (radio link control) PDU (protocol data unit), the first data unit is an IP packet and the second data unit is a PDCP (packet data convergence protocol) PDU (protocol data unit), the at least one field is at least one of a SN field, L field, SI field, E field, and LI field, and the data units are processed to provide a VoIP (Voice of Internet Protocol) service.

It can be also said that the present invention may provide a method of processing data units in a mobile communications system, the method comprising: receiving a first data unit from a lower layer; checking whether or not at least one header field existence indicator is included in the first data unit; generating a second data unit according to the checking step, wherein the first data unit is a MAC (medium access control) PDU (protocol data unit) and the second data unit is a MAC (medium access control) SDU (service data unit), the lower layer is a physical layer.

Also, the present invention may provide a mobile terminal for processing data units in a mobile communications system, the mobile terminal comprising: a first radio protocol entity adapted to generate a first data unit and to transfer the generated first data unit to a second radio protocol entity; and the second radio protocol entity adapted to generate a second data unit using the first data unit, wherein the second data unit includes at least one indicator to indicate whether or not at least one field is existed in a header of the first data unit.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. the present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of processing data units in a mobile communications system, the method comprising:
   generating a first data unit by a first layer;
   transferring the generated first data unit to a second layer; and
   generating a second data unit using the first data unit by the second layer,
   wherein the second data unit includes at least one indicator to indicate whether at least one field exists in a header of the first data unit,
   wherein the at least one indicator comprises a header field existence indicator that is positioned in a first field of the second data unit, and
   wherein the at least one field is at least an L field, an SI field, an E field, or an LI field.

2. The method of claim 1, wherein the first data unit is a radio link control (RLC) protocol data unit (PDU).

3. The method of claim 1, wherein the first layer is a radio link control (RLC) layer.

4. The method of claim 1, wherein the second data unit is a medium access control (MAC) protocol data unit (PDU).

5. The method of claim 1, wherein the second layer is a medium access control (MAC) layer.

6. The method of claim 1, wherein the first data unit is a packet data convergence protocol (PDCP) protocol data unit (PDU) and the second data unit is a radio link control (RLC) PDU.

7. The method of claim 1, wherein the first data unit is an Internet protocol (IP) packet and the second data unit is a packet data convergence protocol (PDCP) protocol data unit (PDU).

8. The method of claim 1, further comprising processing the first data unit and second data unit to provide a Voice over Internet Protocol (VoIP) service.

9. A method of processing data units in a mobile communications system, the method comprising:
   receiving a first data unit from a lower layer;
   checking whether at least one header field existence indicator is included in the first data unit; and
   generating a second data unit following the checking,
   wherein the at least one header field existence indicator is positioned in a first field of the first data unit and indicates whether at least one field exists in a header of the second data unit, and
   wherein the at least one field is at least an L field, an SI field, an E field, or an LI field.

10. The method of claim 9, wherein the first data unit is a medium access control (MAC) protocol data unit (PDU) and the second data unit is a MAC service data unit (SDU).

11. The method of claim 9, wherein the lower layer is a physical layer.

12. A mobile terminal for processing data units in a mobile communications system, the mobile terminal comprising:
   a first radio protocol entity configured to generate a first data unit and to transfer the generated first data unit to a second radio protocol entity; and
   the second radio protocol entity configured to generate a second data unit using the first data unit, wherein the second data unit includes at least one indicator to indicate whether at least one field exists in a header of the first data unit,
   wherein the at least one indicator comprises a header field existence indicator that is positioned in a first field of the second data unit, and
   wherein the at least one field is at least an L field, an SI field, an E field, or an LI field.

* * * * *